(12) United States Patent
Liu et al.

(10) Patent No.: US 11,346,662 B2
(45) Date of Patent: May 31, 2022

(54) METHOD AND DEVICE FOR PREDICTING VOLUME MEDIAN DIAMETER IN OVERLAPPED SPRAY AREA OF TWIN NOZZLES

(71) Applicant: ZHEJIANG UNIVERSITY, Hangzhou (CN)

(72) Inventors: Fei Liu, Hangzhou (CN); Wenwen Kong, Hangzhou (CN); Yufei Liu, Hangzhou (CN); Lei Feng, Hangzhou (CN); Hui Fang, Hangzhou (CN); Han Guo, Hangzhou (CN); Jun Zhou, Hangzhou (CN); Jiangang Shen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 203 days.

(21) Appl. No.: 16/932,537

(22) Filed: Jul. 17, 2020

(65) Prior Publication Data

US 2021/0215479 A1    Jul. 15, 2021

(30) Foreign Application Priority Data

Jan. 15, 2020    (CN) .......................... 202010040851.4

(51) Int. Cl.
| | |
|---|---|
| *B05B 12/08* | (2006.01) |
| *G01B 21/10* | (2006.01) |
| *G06N 3/04* | (2006.01) |
| *G06N 3/08* | (2006.01) |

(52) U.S. Cl.
CPC ............ *G01B 21/10* (2013.01); *B05B 12/082* (2013.01); *G06N 3/04* (2013.01); *G06N 3/08* (2013.01)

(58) Field of Classification Search
USPC ........................................................ 702/157
See application file for complete search history.

(56) References Cited

U.S. PATENT DOCUMENTS

| | | | |
|---|---|---|---|
| 2005/0284958 A1* | 12/2005 | Clarke, III ............ | B05B 7/0081 239/69 |
| 2010/0132439 A1* | 6/2010 | Giles .................... | G01N 29/032 73/64.53 |
| 2014/0195948 A1* | 7/2014 | Magidow .............. | G06F 3/0482 715/771 |

* cited by examiner

*Primary Examiner* — Paul D Lee
(74) *Attorney, Agent, or Firm* — Lando & Anastasi, LLP

(57) ABSTRACT

The invention relates to a method and device for predicting a volume median diameter (VMD) in an overlapped spray area of twin nozzles. Placing a single nozzle at different heights to determine a spray area; measuring all VMDs in the spray area to obtain first true measured values; dividing the first true measured values to construct a first calibration set and a first prediction set; establishing a polynomial fitting formula by a REGRESS function; placing twin nozzles at different heights and different nozzle spacing, and measuring VMDs in the overlapped spray area to obtain second true measured values; determining simulated values of the VMDs of first and second nozzles; dividing the simulated values of the VMDs and the second true measured values to construct a second calibration set and a second prediction set; quantitatively calibrating by using a radial basis function neural network (RBFNN) to obtain a prediction model; determining a VMD in the overlapped spray area of twin nozzles.

20 Claims, 3 Drawing Sheets

METHOD AND DEVICE FOR PREDICTING VOLUME MEDIAN DIAMETER IN OVERLAPPED SPRAY AREA OF TWIN NOZZLES

CROSS REFERENCE TO RELATED APPLICATIONS

This application claims priority to Chinese Patent Application No. 202010040851.4, which was filed on Jan. 15, 2020, titled "METHOD AND DEVICE FOR PREDICTING VOLUME MEDIAN DIAMETER IN OVERLAPPED SPRAY AREA OF TWIN NOZZLES," which is hereby incorporated herein by reference in its entirety for all purposes.

TECHNICAL FIELD

The present invention relates to the field of machine learning (ML), in particular to a method and device for predicting a volume median diameter (VMD) in an overlapped spray area of twin nozzles.

BACKGROUND

Drone spraying features low operating cost, high efficiency and strong maneuverability, and has been widely used in agricultural fertilization and spraying operations. Compared with ground-based spraying, drone spraying is more susceptible to air movement conditions. It also has the problems of big droplet size distribution range, uncertainty of deposition and droplet drift. The droplet drift wastes the fertilizers and pesticides, and will cause various human diseases and pollute the soil. The droplet size is a parameter highly correlated to the droplet drift and also affects the deposition ratio of droplets on the target and the application efficiency of the fertilizers and pesticides. Therefore, it is of great significance to determine the distribution law of the droplet size in the spray area or overlapped spray area of twin nozzles to improve the spraying effect and choose the proper nozzle type. In the spraying process, the spray area between several nozzles is often overlapped. Therefore, it is important to predict the distribution of the droplet size in the overlapped spray area for controlling the spraying effect of the drone and reducing the drift. The volume of all droplets are accumulated in sequence from small to large in the spraying process, volume median diameter (VMD) corresponds to droplet diameter when the droplet volume equals 50% of the total droplet.

Machine learning (ML) methods are widely used in various fields such as agriculture, energy engineering, and biomedicine. In agriculture, the ML methods are mainly used in image processing and automated operations of drones. It is possible to greatly improve the predictive ability of a model for quantifying the droplet size in the spray area of the nozzles by using an ML method.

SUMMARY

An objective of the present invention is to provide a method and device for predicting a volume median diameter (VMD) in an overlapped spray area of twin nozzles. The present invention realizes accurate VMD prediction.

To achieve the above purpose, the present invention provides the following technical solutions.

A method for predicting a VMD in an overlapped spray area of twin nozzles includes:

placing a single nozzle at different heights;

determining a spray area of the single nozzle at different heights;

measuring all VMDs in the spray area at different heights and different horizontal distances in a first set distance from a point directly below the nozzle (as an origin) to the left and right, to obtain first true measured values;

dividing the first true measured values according to a fixed ratio to construct a first calibration set and a first prediction set;

establishing a polynomial fitting formula by a REGRESS function based on the first calibration set and the first prediction set;

placing twin nozzles (a first nozzle and a second nozzle) at different heights and different spacing;

measuring VMDs in an overlapped spray area at different heights, different nozzle spacing and different horizontal distances in a first set distance from midpoints (as origins) of the spacing between the two nozzles to the left and right, to obtain second true measured values;

determining simulated values of the VMDs of the first nozzle and simulated values of the VMDs of the second nozzle based on the polynomial fitting formula;

dividing the simulated values of the VMDs of the first nozzle, the simulated values of the VMDs of the second nozzle and the second true measured values according to a fixed ratio to construct a second calibration set and a second prediction set;

quantitatively calibrating by using a radial basis function neural network (RBFNN) based on the second calibration set and the second prediction set, to obtain a prediction model;

determining a VMD in the overlapped spray area based on the simulated values of the VMDs of the first nozzle, the simulated values of the VMDs of the second nozzle, the second true measured values and the prediction model.

Optionally, the different heights of the nozzle specifically include 1 m, 1.5 m, and 2 m from the ground, respectively.

Optionally, the determining a spray area of the single nozzle at different heights specifically includes:

sequentially arranging a plurality of measuring cylinders directly under the single nozzle, and determining the spray area of the single nozzle at different heights by using a 50% effective deposition determination method, where an outer diameter of the bottom of the measuring cylinders is the same as the first set distance.

Optionally, the first set distance is 6.5 cm.

Optionally, the different spacing specifically includes 0.5 m, 0.6 m and 0.7 m.

The present invention further provides a device for predicting a VMD in an overlapped spray area of twin nozzles, where the device is used to implement the above method, and includes:

a single-chip microcomputer (SCM), a 15 A/3S electric speed controller (ESC), a three-phase brushless water pump, a pressure gauge, a tank, a nozzle, a power supply and a measurement bracket, where the measurement bracket is placed on a horizontal surface;

the nozzle is fixed on the measurement bracket;

the tank is connected with the nozzle to provide water for the nozzle;

the three-phase brushless water pump is connected to the nozzle to adjust a stable water pressure required for spraying;

the SCM is connected to the three-phase brushless water pump to send a pressure regulating signal to the three-phase brushless water pump;

the ESC is connected to the SCM and the three-phase brushless water pump to adjust the pressure of the three-phase brushless water pump according to a pulse-width modulation (PWM) signal provided by the SCM.

Optionally, the measurement bracket is a retractable carbon fiber bracket, and the height of the measurement bracket is adjustable to control the height of the nozzle between 1 m and 2 m.

Optionally, the ESC is a 15 A/3S ESC.

Optionally, the SCM is an Arduino UNO R3 SCM.

Optionally, the power supply is connected to the ESC, and the power supply is a lithium polymer battery, which is durable and stable to output voltage of 12 V.

According to specific examples provided by the present invention, the present invention discloses the following technical effects.

The method in the present invention uses a radial basis function neural network (RBFNN, a machine learning (ML) method) to calibrate the theoretical VMD of a single nozzle of a drone and the actual VMD in the overlapped spray area of twin nozzles of the drone, and achieves a good quantitative calibrating effect. The present invention uses a REGRESS function (a ML method) to model the single-nozzle VMD and establish a cubic term formula, and achieves a good quantitative calibrating effect. This proves the feasibility of using the single-nozzle VMD to predict VMD in the overlapped spray area of the twin nozzles of the drone, laying a solid foundation for the prediction of the overlap VMD of multiple nozzles (more than two nozzles).

The device of the present invention directly uses a single-chip microcomputer (SCM) to control a water pump, which keeps the pressure of the nozzle constant. The device also realizes the free adjustment of the height of the nozzle within a certain range.

BRIEF DESCRIPTION OF DRAWINGS

To describe the technical solutions in the examples of the present invention or in the prior art more clearly, the accompanying drawings required for the examples are briefly described below. Apparently, the accompanying drawings in the following description show merely some examples of the present invention, and a person of ordinary skill in the art may still derive other accompanying drawings from these accompanying drawings without creative efforts.

REFERENCE NUMERALS

1. single-chip microcomputer (SCM); 2. 15 A/3S electric speed controller (ESC); 3. three-phase brushless water pump; 4. pressure gauge; 5. tank; 6. nozzle; 7. measurement bracket; and 8. power supply.

DETAILED DESCRIPTION

The technical solutions in the examples of the present invention are clearly and completely described below with reference to the accompanying drawings in the examples of the present invention. Apparently, the described examples are merely a part of the examples of the present invention. All other examples obtained by a person of ordinary skill in the art based on the examples of the present invention without creative efforts shall fall within the protection scope of the present invention.

An objective of the present invention is to provide a method and device for predicting a volume median diameter (VMD) in an overlapped spray area of twin nozzles. The present invention realizes accurate VMD prediction.

In order to make the above objectives, features and advantages of the present invention more understandable, the present invention will be described in further detail below with reference to the accompanying drawings and detailed examples.

Figure 1:
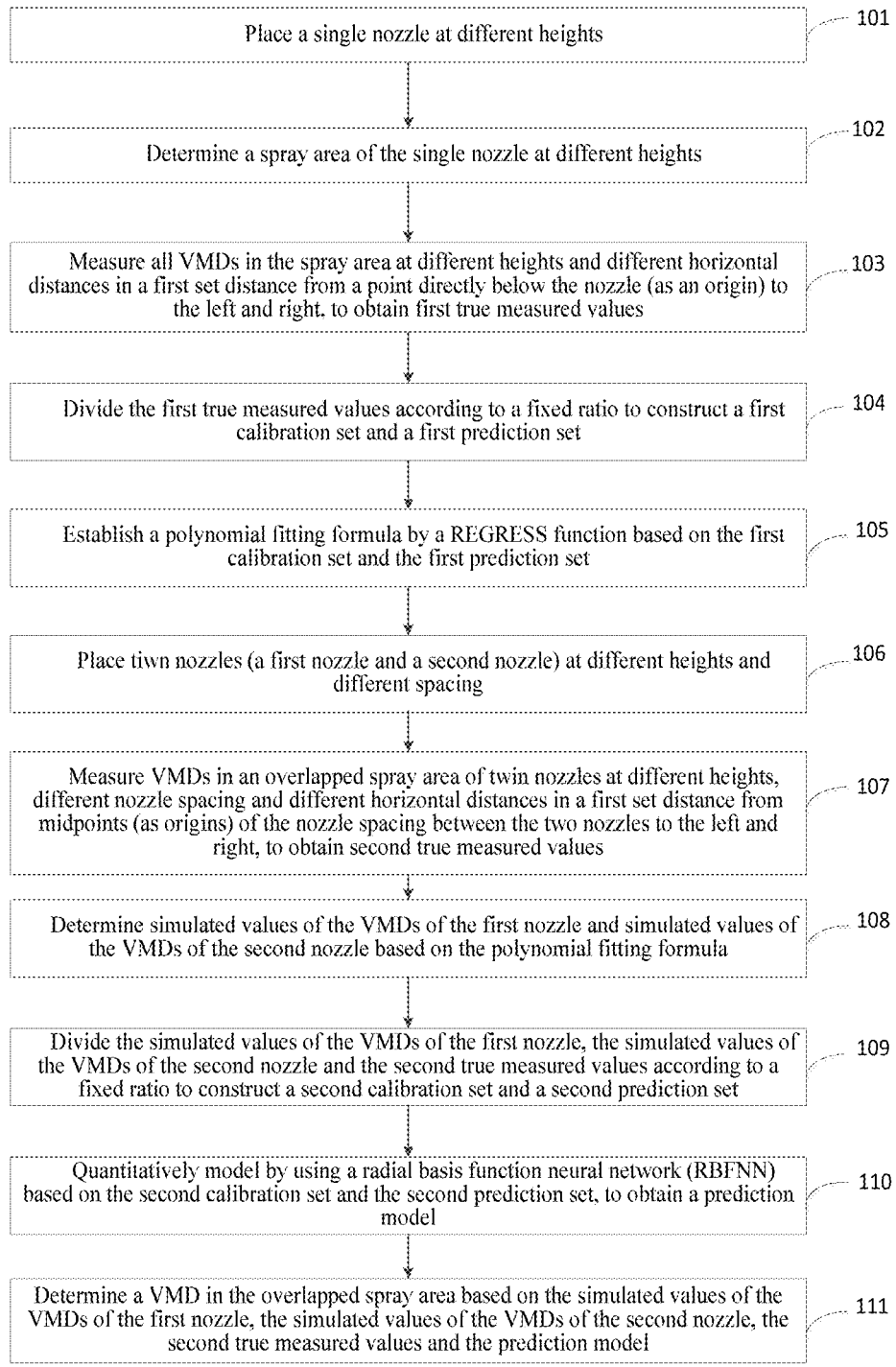
FIG. 1 is a flowchart of a method for predicting a volume median diameter (VMD) in an overlapped spray area of twin nozzles according to an example of the present invention.

FIG. 1 is a flowchart of a method for predicting a VMD in an overlapped spray area of twin nozzles according to an example of the present invention. As shown in FIG. 1, the method includes:

Step 101: place a single nozzle at different heights.

Specifically, the heights of the nozzle are 1 m, 1.5 m, and 2 m respectively.

Step 102: determine a spray area of the single nozzle at different heights.

Figure 2:
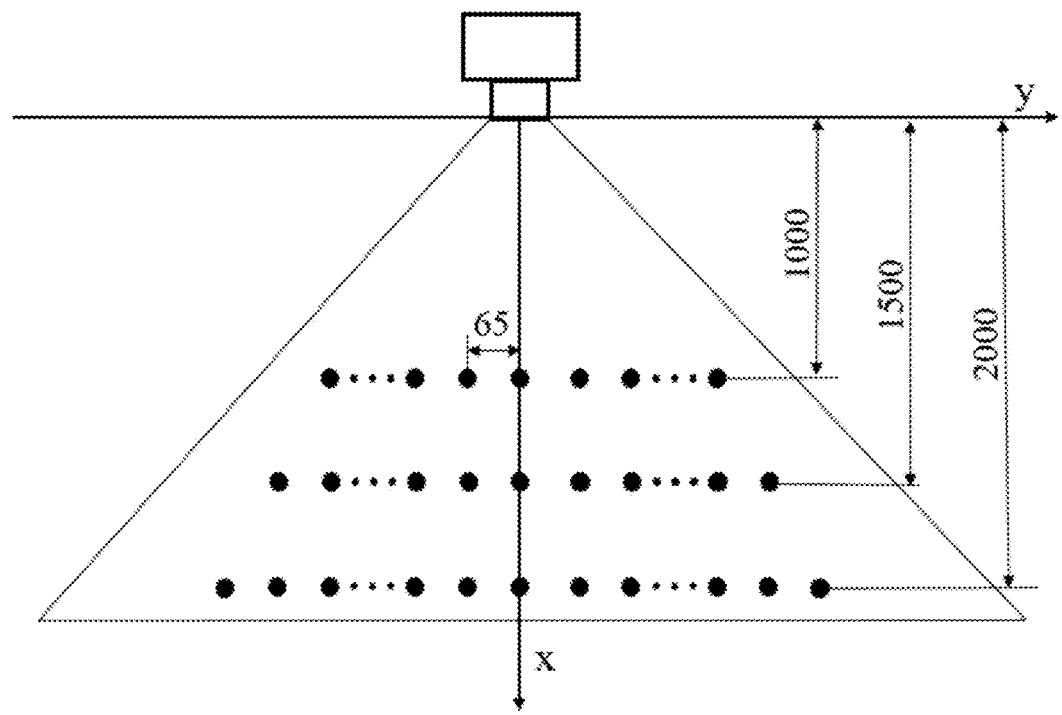
FIG. 2 is a schematic diagram of measuring a single nozzle of a drone according to an example of the present invention.

As shown in FIG. 2, a schematic diagram of measuring a single nozzle of a drone according to an example of the present invention, the single nozzle is measured as follows:

A plurality of measuring cylinders are sequentially arranged directly under the single nozzle, and the spray area of the single nozzle at different heights is determined by using a 50% effective deposition determination method. The outer diameter of the bottom of the measuring cylinders is the same as a first set distance.

In an example of the present invention, 100 ml measuring cylinders, totaling 31, are placed horizontally directly on double sides directly below the nozzle, 1 in the middle and 15 on each side. The spray widths of the nozzle at the three heights are determined according to the 50% effective deposition determination method. The final measurement results show that the spray widths of the nozzle are 1,040 mm, 1,300 mm and 1,430 mm at the heights of 1 m, 1.5 m and 2 m, respectively.

Each height is measured with the 100 ml measuring cylinders for three times to take an average. Each measurement lasts 5 min, and a head-up reading is taken directly. During the experiment, the deposition amounts of all measuring points at different horizontal distances under the same height are measured at the same time.

The 50% effective deposition determination method is specifically: measure the deposition amounts of each measuring point of the single nozzle; plot a curve by taking the deposition amounts as longitudinal coordinates and the horizontal distances as horizontal coordinates; take a distance between two points on each side of the curve where the deposition amount is half the maximum deposition amount as the effective spray width.

Step 103: measure all VMDs in the spray ranges at different heights and different horizontal distances in a first set distance from a point directly below the nozzle (as an origin) to the left and right, to obtain first true measured values.

Specifically, the first set distance is 6.5 cm, which is the same as the outer diameter of the bottom of the 100 ml measuring cylinders, and a laser particle size analyzer is used to obtain the VMDs.

To measure the droplet size of twin nozzles, the laser particle size analyzer is first leveled and calibrated to ensure the accuracy of the measurement data. The laser beam of the laser particle size analyzer passes through a measurement point in the spray area vertically. The changes in the VMDs are observed. When the data acquisition being stable, 60 repeated VMDs are collected from each measurement, and the average value is taken as the VMD of the measurement point. Three VMDs of the measurement point are repeatedly taken, and an average value is taken as the final VMD of the measurement point.

Step 104: divide the first true measured values according to a fixed ratio to construct a first calibration set and a first prediction set, the fixed ratio being 3:1.

Step 105: establish a polynomial fitting formula by a REGRESS function based on the first calibration set and the first prediction set.

According to the obtained VMD of the single nozzle, all the droplet sizes are divided into a calibration set and a prediction set with a ratio of 3:1. The data of the calibration set is brought into the REGRESS function of matrix laboratory (MATLAB) to establish a polynomial fitting formula with the highest term of degree 3. In the obtained fitting formula, a correlation coefficient of the calibration set reaches 0.9686, and a correlation coefficient of the prediction set reaches 0.9592. The VMD is expressed as follows:

$$z=147.3650+15.5766x+0.0661y-17.0732x^2-0.0776x\cdot y+0.0073y^2+7.001x^3+0.0222x^2\cdot y-0.0022x\cdot y^2$$

x is a nozzle height (m), y is a horizontal distance (cm), and z is a VMD (μm).

Step 106: place twin nozzles (a first nozzle and a second nozzle) at different heights and different spacing.

Specifically, the different heights are 1 m, 1.5 m and 2 m, and the different spacing is 0.5 m, 0.6 m and 0.7 m.

Step 107: measure VMDs in an overlapped spray area at different heights, different nozzle spacing and different horizontal distances in a first set distance from midpoints (as origins) of the spacing between the two nozzles to the left and right, to obtain second true measured values.

Figure 3:
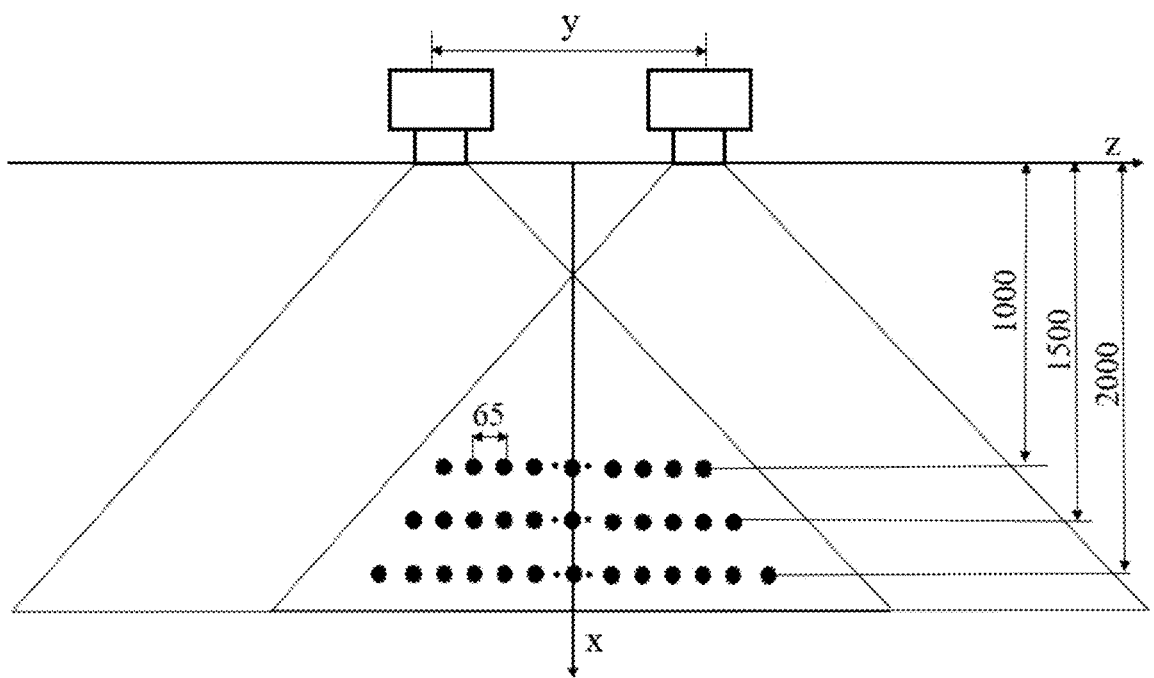
FIG. 3 is a schematic diagram of measuring twin nozzles of a drone according to an example of the present invention.

As shown in FIG. 3, the measurement method of the VMDs in the overlapped spray area of the spray area in this step is the same as that in Step 103, and will not be repeated here.

Step 108: determine simulated values of the VMDs of the first nozzle and simulated values of the VMDs of the second nozzle based on the polynomial fitting formula.

Step 109: divide the simulated values of the VMDs of the first nozzle, the simulated values of the VMDs of the second nozzle and the second true measured values according to a fixed ratio to construct a second calibration set and a second prediction set.

Step 110: quantitatively calibrate by using a radial basis function neural network (RBFNN) based on the second calibration set and the second prediction set, to obtain a prediction model.

Specifically, a diffusion coefficient of the model is 35, a correlation coefficient of the calibration set reaches 0.9781, a root mean square error (RMSE) of the calibration set is 1.5578, a correlation coefficient of the prediction set reaches 0.9282, and an RMSE of the prediction set is 3.2595.

Step 111: determine a VMD in the overlapped spray area based on the simulated values of the VMDs of the first nozzle, the simulated values of the VMDs of the second nozzle, the second true measured values and the prediction model.

Figure 4:
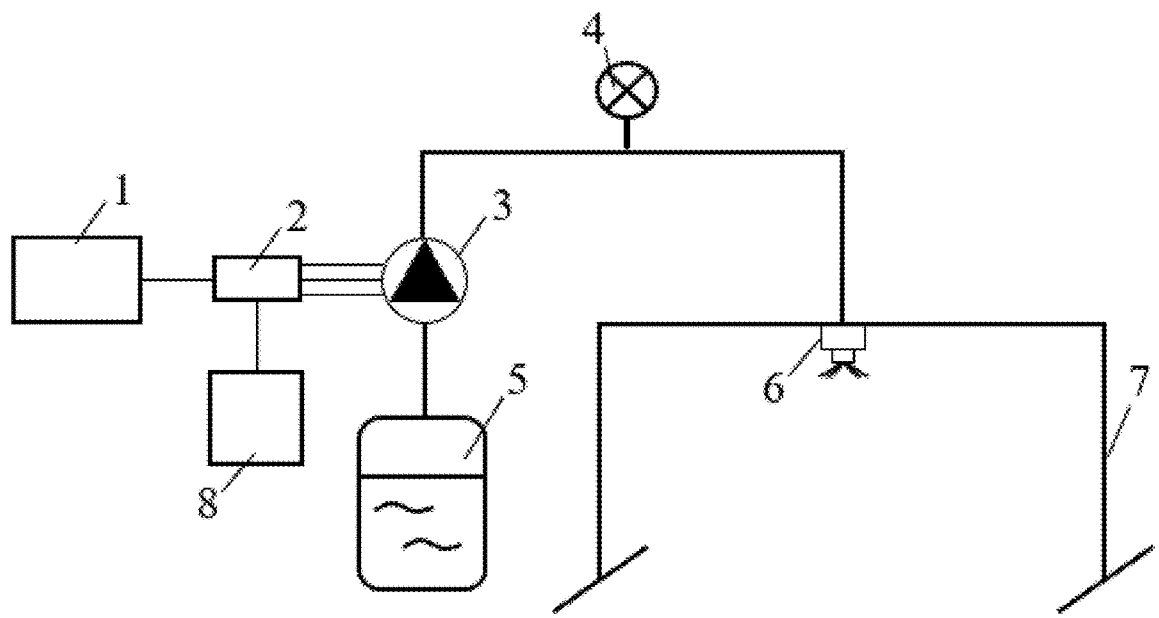
FIG. 4 is a structural diagram of a device for predicting a VMD in an overlapped spray area of a single nozzle according to an example of the present invention.
Figure 5:
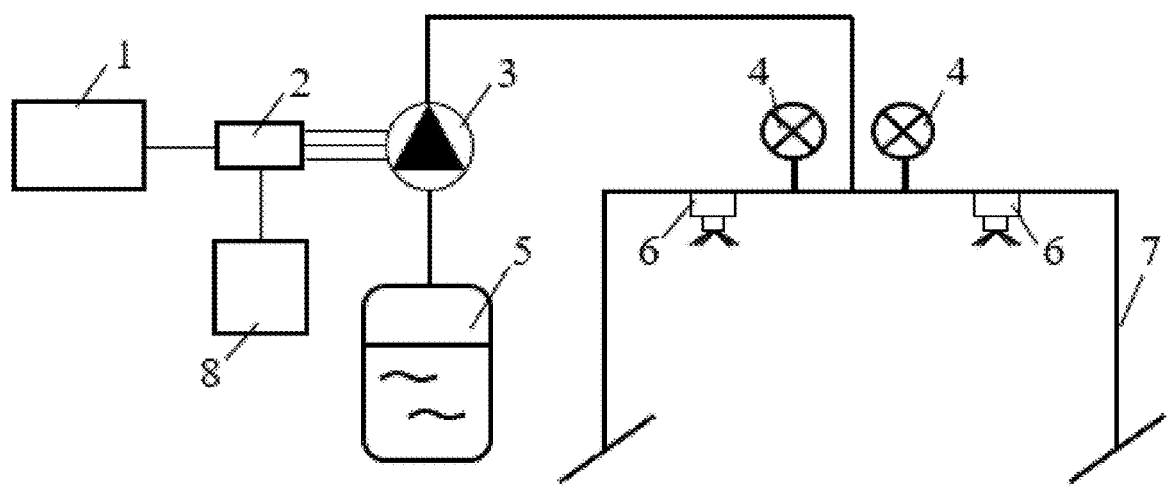
FIG. 5 is a structural diagram of a device for predicting a VMD in an overlapped spray area of twin nozzles according to an example of the present invention.

FIG. 4 is a schematic diagram of a device for predicting a VMD in an overlapped spray area of twin nozzles according to an example of the present invention. As shown in FIG. 4, the device includes:

a single-chip microcomputer (SCM) 1, a 15 A/3S electric speed controller (ESC) 2, a three-phase brushless water pump 3, a pressure gauge 4, a tank 5, a nozzle 6, a measurement bracket 7, and a power supply 8.

The measurement bracket 7 is placed on a horizontal surface to realize the varying heights of the nozzle. The measurement bracket is a retractable carbon fiber bracket, and the height of the measurement bracket is adjustable to control the height of the nozzle between 1 m and 2 m to meet experimental needs.

The nozzle 6 is fixed on the measurement bracket 7. The to-be-tested nozzle is a Teejet XR110-015 nozzle, which is commonly used in drone spraying.

The tank 5 has a capacity of 10 L, and is connected to the nozzle 6 to provide the amount of water required for the experiment.

The three-phase brushless water pump 3 is connected to the nozzle to adjust a stable water pressure required for spraying, and is controlled by an Arduino SCM.

The SCM 1 is connected to the three-phase brushless water pump 3 to send a pressure regulating signal to the three-phase brushless water pump.

The ESC 2 is connected to the SCM and the three-phase brushless water pump to adjust the pressure of the three-phase brushless water pump according to a pulse-width modulation (PWM) signal provided by the SCM. The ESC is a 15 A/3S ESC, which is used to change the output pressure of the water pump according to a PWM signal provided by a pin (Pin3) of the SCM to allow single or twin nozzles of a drone to operate under 0.2 MPa. In addition, the ESC has a step-down function to reduce the 12 V output of the power supply to 5 V to provide a stable voltage for the Arduino UNO R3 SCM.

The power supply 8 is connected to the ESC; the power supply 8 is a lithium polymer battery, which is durable and stable to output voltage of 12V.

Each example of the present specification is described in a progressive manner, each example focuses on the difference from other examples, and the same and similar parts between the examples may refer to each other.

In this paper, several examples are used for illustration of the principles and implementations of the present invention. The description of the foregoing examples is used to help illustrate the method and the core principles of the present invention. In addition, those technicians can make various modifications in terms of specific implementations and scope of application in accordance with the teachings of the present invention. In conclusion, the content of the present specification should not be construed as a limitation to the present invention.

What is claimed is:
1. A method for predicting a volume median diameter (VMD) in an overlapped spray area of twin nozzles, wherein the prediction method comprises:
 placing a single nozzle at different heights;
 determining a spray area of the single nozzle at different heights;

measuring all VMDs in the spray area at different heights and different horizontal distances in a first set distance from a point directly below the nozzle (as an origin) to the left and right, to obtain first true measured values;

dividing the first true measured values according to a fixed ratio to construct a first calibration set and a first prediction set;

establishing a polynomial fitting formula by a REGRESS function based on the first calibration set and the first prediction set;

placing twin nozzles (a first nozzle and a second nozzle) at different heights and different spacing;

measuring VMDs in an overlapped spray area at different heights, different nozzle spacing and different horizontal distances in a first set distance from midpoints (as origins) of the spacing between the two nozzles to the left and right, to obtain second true measured values;

determining simulated values of the VMDs of the first nozzle and simulated values of the VMDs of the second nozzle based on the polynomial fitting formula;

dividing the simulated values of the VMDs of the first nozzle, the simulated values of the VMDs of the second nozzle and the second true measured values according to a fixed ratio to construct a second calibration set and a second prediction set;

quantitatively calibrating by using a radial basis function neural network (RBFNN) based on the second calibration set and the second prediction set, to obtain a prediction model; and determining a VMD in the overlapped spray area based on the simulated values of the VMDs of the first nozzle, the simulated values of the VMDs of the second nozzle, the second true measured values and the prediction model.

2. The method for predicting a VMD in an overlapped spray area of twin nozzles according to claim 1, wherein the different heights of the nozzle specifically comprise 1 m, 1.5 m, and 2 m from the ground, respectively.

3. A device for predicting a VMD in an overlapped spray area of twin nozzles, wherein the device is used to implement the method according to claim 2, and comprises:

a single-chip microcomputer (SCM), a 15 A/3S electric speed controller (ESC), a three-phase brushless water pump, a pressure gauge, a tank, a nozzle, a power supply and a measurement bracket, wherein the measurement bracket is placed on a horizontal surface;

the nozzle is fixed on the measurement bracket;

the tank is connected with the nozzle to provide water for the nozzle;

the three-phase brushless water pump is connected to the nozzle to adjust a stable water pressure required for spraying;

the SCM is connected to the three-phase brushless water pump to send a pressure regulating signal to the three-phase brushless water pump;

the ESC is connected to the SCM and the three-phase brushless water pump to adjust the pressure of the three-phase brushless water pump according to a pulse-width modulation (PWM) signal provided by the SCM.

4. The device for predicting a VMD in an overlapped spray area of twin nozzles according to claim 3, wherein the measurement bracket is a retractable carbon fiber bracket, and the height of the measurement bracket is adjustable to control the height of the nozzle between 1 m and 2 m.

5. The device for predicting a VMD in an overlapped spray area of twin nozzles according to claim 3, wherein the ESC is a 15 A/3S ESC.

6. The method for predicting a VMD in an overlapped spray area of twin nozzles according to claim 1, wherein the determining a spray area of the single nozzle at different heights specifically comprises:

sequentially arranging a plurality of measuring cylinders directly under the single nozzle, and determining the spray area of the single nozzle at different heights by using a 50% effective deposition determination method, wherein an outer diameter of the bottom of the measuring cylinders is the same as the first set distance.

7. A device for predicting a VMD in an overlapped spray area of twin nozzles, wherein the device is used to implement the method according to claim 6, and comprises:

a single-chip microcomputer (SCM), a 15 A/3S electric speed controller (ESC), a three-phase brushless water pump, a pressure gauge, a tank, a nozzle, a power supply and a measurement bracket, wherein the measurement bracket is placed on a horizontal surface;

the nozzle is fixed on the measurement bracket;

the tank is connected with the nozzle to provide water for the nozzle;

the three-phase brushless water pump is connected to the nozzle to adjust a stable water pressure required for spraying;

the SCM is connected to the three-phase brushless water pump to send a pressure regulating signal to the three-phase brushless water pump;

the ESC is connected to the SCM and the three-phase brushless water pump to adjust the pressure of the three-phase brushless water pump according to a pulse-width modulation (PWM) signal provided by the SCM.

8. The device for predicting a VMD in an overlapped spray area of twin nozzles according to claim 7, wherein the measurement bracket is a retractable carbon fiber bracket, and the height of the measurement bracket is adjustable to control the height of the nozzle between 1 m and 2 m.

9. The device for predicting a VMD in an overlapped spray area of twin nozzles according to claim 7, wherein the ESC is a 15 A/3S ESC.

10. The method for predicting a VMD in an overlapped spray area of twin nozzles according to claim 1, wherein the first set distance is 6.5 cm.

11. A device for predicting a VMD in an overlapped spray area of twin nozzles, wherein the device is used to implement the method according to claim 10, and comprises:

a single-chip microcomputer (SCM), a 15 A/3S electric speed controller (ESC), a three-phase brushless water pump, a pressure gauge, a tank, a nozzle, a power supply and a measurement bracket, wherein the measurement bracket is placed on a horizontal surface;

the nozzle is fixed on the measurement bracket;

the tank is connected with the nozzle to provide water for the nozzle;

the three-phase brushless water pump is connected to the nozzle to adjust a stable water pressure required for spraying;

the SCM is connected to the three-phase brushless water pump to send a pressure regulating signal to the three-phase brushless water pump;

the ESC is connected to the SCM and the three-phase brushless water pump to adjust the pressure of the three-phase brushless water pump according to a pulse-width modulation (PWM) signal provided by the SCM.

12. The device for predicting a VMD in an overlapped spray area of twin nozzles according to claim 11, wherein the measurement bracket is a retractable carbon fiber bracket, and the height of the measurement bracket is adjustable to control the height of the nozzle between 1 m and 2 m.

13. The method for predicting a VMD in an overlapped spray area of twin nozzles according to claim 1, wherein the different spacing specifically comprises 0.5 m, 0.6 m and 0.7 m.

14. A device for predicting a VMD in an overlapped spray area of twin nozzles, wherein the device is used to implement the method according to claim 13, and comprises:
 a single-chip microcomputer (SCM), a 15 A/3S electric speed controller (ESC), a three-phase brushless water pump, a pressure gauge, a tank, a nozzle, a power supply and a measurement bracket, wherein
 the measurement bracket is placed on a horizontal surface;
 the nozzle is fixed on the measurement bracket;
 the tank is connected with the nozzle to provide water for the nozzle;
 the three-phase brushless water pump is connected to the nozzle to adjust a stable water pressure required for spraying;
 the SCM is connected to the three-phase brushless water pump to send a pressure regulating signal to the three-phase brushless water pump;
 the ESC is connected to the SCM and the three-phase brushless water pump to adjust the pressure of the three-phase brushless water pump according to a pulse-width modulation (PWM) signal provided by the SCM.

15. The device for predicting a VMD in an overlapped spray area of twin nozzles according to claim 14, wherein the measurement bracket is a retractable carbon fiber bracket, and the height of the measurement bracket is adjustable to control the height of the nozzle between 1 m and 2 m.

16. A device for predicting a VMD in an overlapped spray area of twin nozzles, wherein the device is used to implement the method according to claim 1, and comprises:
 a single-chip microcomputer (SCM), a 15 A/3S electric speed controller (ESC), a three-phase brushless water pump, a pressure gauge, a tank, a nozzle, a power supply and a measurement bracket, wherein
 the measurement bracket is placed on a horizontal surface;
 the nozzle is fixed on the measurement bracket;
 the tank is connected with the nozzle to provide water for the nozzle;
 the three-phase brushless water pump is connected to the nozzle to adjust a stable water pressure required for spraying;
 the SCM is connected to the three-phase brushless water pump to send a pressure regulating signal to the three-phase brushless water pump;
 the ESC is connected to the SCM and the three-phase brushless water pump to adjust the pressure of the three-phase brushless water pump according to a pulse-width modulation (PWM) signal provided by the SCM.

17. The device for predicting a VMD in an overlapped spray area of twin nozzles according to claim 16, wherein the measurement bracket is a retractable carbon fiber bracket, and the height of the measurement bracket is adjustable to control the height of the nozzle between 1 m and 2 m.

18. The device for predicting a VMD in an overlapped spray area of twin nozzles according to claim 16, wherein the ESC is a 15 A/3S ESC.

19. The device for predicting a VMD in an overlapped spray area of twin nozzles according to claim 16, wherein the SCM is an Arduino UNO R3 SCM.

20. The device for predicting a VMD in an overlapped spray area of twin nozzles according to claim 16, wherein the power supply is connected to the ESC, and the power supply is a lithium polymer battery, which is durable and stable to output voltage of 12 V.

\* \* \* \* \*